US008015232B2

(12) United States Patent
Vigil et al.

(10) Patent No.: US 8,015,232 B2
(45) Date of Patent: Sep. 6, 2011

(54) THIN TERMINAL COMPUTER ARCHITECTURE UTILIZING ROAMING KEYBOARD FILES

(75) Inventors: Jose Manuel Vigil, Buenos Aires (AR); Fabian Franz, Karlsruhe (DE)

(73) Assignee: Roaming Keyboards LLC, Millbrae, CA (US)

( * ) Notice: Subject to any disclaimer, the term of this patent is extended or adjusted under 35 U.S.C. 154(b) by 158 days.

(21) Appl. No.: 12/248,785

(22) Filed: Oct. 9, 2008

(65) Prior Publication Data

US 2009/0100129 A1    Apr. 16, 2009

Related U.S. Application Data

(60) Provisional application No. 60/979,203, filed on Oct. 11, 2007.

(51) Int. Cl.
  *G06F 15/16* (2006.01)
(52) U.S. Cl. .................... 709/200; 709/203; 345/173
(58) Field of Classification Search .................. 709/203, 709/217–219, 223; 345/156, 168, 173
  See application file for complete search history.

(56) References Cited

U.S. PATENT DOCUMENTS

| | | | |
|---|---|---|---|
| 6,301,626 B1 | 10/2001 | Knox | |
| 6,677,933 B1* | 1/2004 | Yogaratnam | 345/174 |
| 7,030,863 B2* | 4/2006 | Longe et al. | 345/173 |
| 7,092,702 B2 | 8/2006 | Cronin et al. | |
| 7,231,230 B2 | 6/2007 | Yoshikawa | |
| 7,250,938 B2* | 7/2007 | Kirkland et al. | 345/168 |
| 2002/0065109 A1* | 5/2002 | Mansikkaniemi et al. | 455/566 |
| 2002/0075317 A1* | 6/2002 | Dardick | 345/808 |
| 2004/0021681 A1* | 2/2004 | Liao | 345/702 |
| 2005/0225538 A1* | 10/2005 | Verhaegh | 345/173 |
| 2007/0061488 A1 | 3/2007 | Alagappan et al. | |
| 2007/0063984 A1* | 3/2007 | Chung | 345/173 |
| 2008/0284744 A1* | 11/2008 | Park et al. | 345/173 |
| 2008/0320410 A1* | 12/2008 | Whytock et al. | 715/773 |
| 2009/0189864 A1* | 7/2009 | Walker et al. | 345/169 |
| 2009/0213081 A1* | 8/2009 | Case, Jr. | 345/173 |
| 2010/0060585 A1* | 3/2010 | Chiu | 345/168 |
| 2010/0138780 A1* | 6/2010 | Marano et al. | 715/804 |

OTHER PUBLICATIONS

International Search Report and Written Opinion for PCT/US08/079635 dated Jun. 1, 2009.

* cited by examiner

*Primary Examiner* — Faruk Hamza
(74) *Attorney, Agent, or Firm* — Alvin Fashu-Kan

(57) ABSTRACT

A thin client server system including a client server configured to transfer at least one roaming keyboard file to at least one thin client terminal is described. The thin client terminal includes a touch-sensitive interface, session layout module and a client processing module. The session layout module generates a selection configuration for selecting the type of interaction with the client server system. The client processing module applies the at least one roaming keyboard file and to dynamically generate, input sub-modules for receiving communication from at least one user and an output sub-module for generating output to at least one user. The generated input sub-module including, a virtual keyboard sub-module, and a pointer-pad sub-module and the generated output sub-module including a virtual screen sub-module for generating output to at least one user, wherein the client sever allows modular collaboration while multiplexing input and output message between sub-modules.

20 Claims, 8 Drawing Sheets

THIN TERMINAL COMPUTER ARCHITECTURE UTILIZING ROAMING KEYBOARD FILES

RELATED APPLICATIONS

This application claims the benefit of U.S. Provisional Patent Application Ser. No. 60/979,203, filed Oct. 11, 2007, entitled "THIN TERMINAL COMPUTER ARCHITECTURE UTILIZING ROAMING KEYBOARD FILES," which is hereby incorporated by reference in its entirety.

FIELD OF THE INVENTION

Overall, the invention relates to static and mobile network computers comprised of a touch-sensitive interface controlled by a thin client server capable of transferring roaming keyboard files that dynamically determine the input and output behavior of at least one thin client terminal, thereby enabling modular input-output collaboration with multiplexing features.

BACKGROUND

A new generation of touch and multi-touch-sensitive devices has allowed interaction with computers to become more intuitive and user-friendly. Indeed, the use of fingers and hands to operate computers has widened the scope of interaction between man and computers. This latter fact, together with efficient communal wireless networks and the large variety of low-cost touch-sensitive devices flooding the market require mechanisms to integrate them all, thereby capitalizing them to work at the service of groups and individuals as opposed to them working independently from each other. At some point, the huge number of touch-sensitive devices on the market will mean people will be carrying more than one item in their daily routine or even two portable devices with different form factors. Furthermore, multi-touch technology will embrace both the home and the professional environments offering a variety of multiple touch solutions. The challenge consists of controlling and making the most of this growing phenomenon. Independent devices are a great solution for individual needs and services. Nevertheless, accumulating a large number of independent devices results in a waste of energy and resources with negative ecological impact.

Independent devices and independent personal computers are provided with a single screen for the display of graphics and data; the single screen is typically designed to provide adequate viewing for one person only at a time. These devices are extremely useful when it comes to providing personal computer services and unlimited access to information. However, they are limited in terms of multiple user interaction or interaction with other devices. There are many instances where more interactivity is required, not only in the individual aspect where a user might need to work with several devices simultaneously but also when multiple users want to perform a same computer activity in collaboration. U.S. Pat. No. 628,430, for example, discloses a folding and separable multi-display computing system allowing interactivity between two touch-sensitive computing devices: a primary device that works with a separated secondary computing device in collaboration.

What is needed is a system and method that will improve multiple user interaction of computer devices or improve interaction of the computer devices with other devices.

SUMMARY

Huge progress has been made regarding the use of collaborative interaction between humans and computers. Two of the best-known technologies that offer similar interactions are key elements in the present invention. In fact, the latter blends both technologies allowing them to equate and work hand in hand. One of these technologies consists of touch-sensitive computing. Wide touch-sensitive screen areas such as tabletops or media walls allow for the use of both hands, thereby interacting with one person or more within the same interface perimeter. The second technology consists of network computing or thin client technology, whereby various users operating thin client computers with a mouse, keyboard and monitor can perform shadowing visualization of a same remote desktop in group activities. Both these collaborative interactive technologies have now been joined in order to provide the best results within the same environment. Thanks to the modular interface system revealed in the present invention, a touch-sensitive technological framework (including virtual devices, both catalogued and sorted by profile type) is literally merged into thin client architecture.

Thin client architecture, offers a clever network computing framework and a solid client server session environment to work with. In fact, the thin client server environment provides a key element consisting of a virtual screen. The fact that the thin client technology normally utilizes a sequence of images to provide remote desktop running as a movie across the network means an ideal opportunity to manipulate the area and geometry of the virtual screen and use it as a molding resource to integrate into a modular system. This offers great versatility at the time of dynamically building virtual devices as the present invention does. Thin client technology also offers the perfect solution not only for storing known session preferences such as desktop settings, display area size, and applications running, but also to store and handle additional information like user interface information as the invention does. However one of the most significant features about thin client technology is multiplexing. This feature allows input and output message to be shadowed between one or more, thin client terminals providing collaborative interaction, that provides an ideal opportunity to create dynamic sub-modules that can change the input and output behaviour in a controlled manner. In one embodiment, thin client technology can be utilized as a scaffold for storing a user interface modular system within customized "Roaming Keyboard Files", designed and aimed at meeting the requirements of multiple and specific individuals or group profiles.

The present invention offers new features to satisfy the ongoing touch-sensitive framework and the collaborative interaction of actual and future computer scene requirements. By integrating the above mentioned roaming keyboard files into the controlled session environment of a thin client server as a scaffold and storing this information into a relational database, both managing and administrating the thin client service and the user interface service, take place in an integrated harmonious environment. In one embodiment, a customizable modular interface system is configured to dynamically change features, at runtime, such as, layout design, skinning, appearance, and behaviour, in at least one network computer featuring a touch-sensitive interface. The customized user interfaces can be generated for use and provided to individual users or groups, thereby adapting dynamically to their specific needs and requirements and using, alternatively, one or more thin client computers. The specific user interface information associated with the roaming keyboard files is manipulated to customize the user interface functionality.

The roaming keyboard files are transferred from the client server and applied in at least one thin client terminal, under certain conditions defined by the user, for example. These conditions can be defined in a session layout module such as a session layout administrator form (from now on referred to as the "SLA form") associated with a computer interface. The SLA form is utilized for selecting the type of interaction with the system.

In one embodiment, the SLA form is used during the session login process. The SLA form is prompted to the user after providing the right credentials into the login form corresponding to the thin client terminal he/she is operating as master node. The SLA form is configured to provide visual information regarding the different configurations stored at the client server database that will determine the characteristics of the ongoing session and the type of interaction with the system. The SLA form's visual information includes: the type of configuration labeled with both a name and a written description; the roaming keyboard files, including the layout design, the skinning information (appearance), the applications (remotely controlled) running on the session at the client server, the operating system, and thin client terminals involved. The user can navigate and select a proper configuration according to his or her needs. Once the selection is made and the session has started, the selected roaming keyboard files are transferred from the client server to at least one thin client terminal, that is previously selected and applied by means of a client processing module. Once the roaming keyboard files are applied, the client processing module dynamically generates input sub-modules to interact with at least one user and an output sub-module for generating output to at least one user.

The client processing module frames and applies the transferred roaming keyboard files according to the type of file formats contained therein. A data file, such as an Extensible Markup Language (XML) file, stores, inter alia, the parameters defining the size and position of the sub-modules. The client processing module can include an embedded player object and an embedded virtual machine object configured to run Shockwave Flash (SWF) files and Java™ Archive (JAR) files. As a result, a virtual keyboard sub-module and a pointer-pad sub-module are dynamically generated, thereby supplying a multi-point interactive tool. In one embodiment, the generated virtual keyboard sub-module and a pointer-pad sub-module includes a screen sub-module providing output to at least one user, where the sub-modules are capable of reproducing remote applications, data, and even entire desktop running at the client server. Once the sub-modules are framed and executed, the system is ready to operate. The input sub-modules receive information from at least one user by means of touch, gestures and stylus input and the output sub-module generate output to at least one user. A gesture is a form of non-verbal communication. In this embodiment, a gesture includes moving the fingers, and especially the finger-buds, on top of or over the touch-sensitive screen in order to input information. One gesture, for example, consists of zooming in and out of an image on the computer screen by separating or putting the thumb and index fingers together.

During this process, the input provided is transformed into an input message and sent to the client server. The client server runs the command information into the application by means of an automated module, for example, that is capable of running automation protocols. The input message is then transformed into an output message, multiplexed and sent to the thin client terminal as an output message containing the output sub-module. The at least one user then visualizes the output message on the output sub-module as the result of the provided input.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 2:
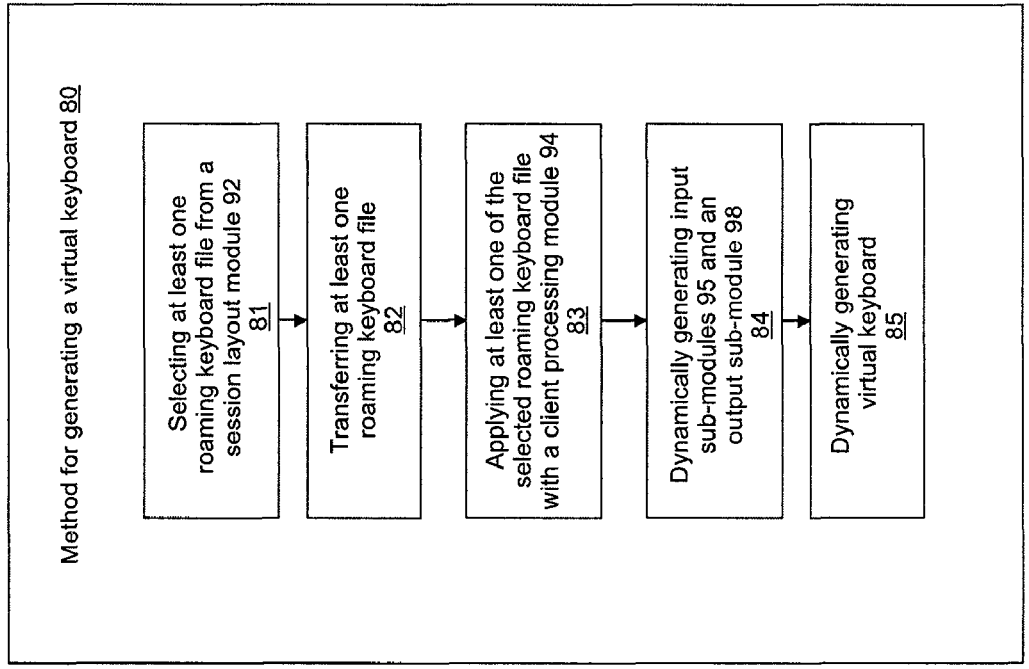
FIG. 2 illustrates a block diagram of the method for generating a virtual keyboard described in claim 17.

After reading this description it will become apparent to one skilled in the art how to implement the invention in various alternative embodiments and alternative applications. However, although various embodiments will be described herein, it is understood that these embodiments are presented by way of example only, and not limitation. As such, this detailed description of various alternative embodiments should not be construed to limit the scope or breadth of the present invention as set forth in the appended claims.

Typically, in order to work with a system, users have to be able to both control it and assess it. In computer science and human-computer interaction, the system and program control can be performed by different types of user interfaces, such as a keyboard a mouse and a touch-sensitive interface, among others. For these cases, the interaction would be very different in that the user would provide keystrokes through the computer keyboard, movements for the computer mouse, and a touch or gesture for the touch-sensitive interfaces. Keyboard and mouse are pure input devices while touch-sensitive interfaces are a combination of input and output devices. In touch-screen devices the same touch-sensitive surface that receives the touch input also provides screen output, where these functionalities can be controlled by means of a software program running into the touch-screen device. Some software applications running on touch-screen devices efficiently emulate virtual keyboards utilized on top of the same output screen. In one embodiment, a touch-screen application would contain virtual devices working freely within the screen and overlapping, while interacting with the user. In other embodiments, virtual devices, including the screen, are framed within customizable input-output modules (presented as sub-modules contained in a user interface module), offering dynamism, adaptability and above all modular collaboration. Consequently, the user interface can be put together as a puzzle containing different sub-modules, allowing for different scenarios according to the profiles used. This provides various forms of systemic functionality ordered by means of a centralized solution integrated with advanced networking practices.

The input-output virtual devices can include customizable input-output sub-modules ("puzzle pieces") dynamically built at runtime on the at least one thin client terminal 93, while the user logs into the system. A client processing module 94 handled locally by a software program (or local application) and embedded in the thin client terminals 93 (a thin client terminal 93 can be multiple thin client terminals 93 or a plurality of thin client terminals 93) frames and executes the said sub-modules based on a series of files called "Roaming Keyboard Files". The latter contain customized user interface data and are transferred from the Client Server 100 to the thin client terminals 93 on user demand. Therefore, the user interfaces of the system are dynamically built on the fly according to user needs: the mechanical keyboard is emulated by a virtual keyboard sub-module 96 and the mouse is emulated by a pointer-pad sub-module 97 thereby becoming multipoint device. In other embodiments, thin client technology is adopted to integrate screen output within a virtual screen sub-module 99, allowing for a smooth and dynamic adaptation of the screen device into the system. As a result of this integration, these three input-output virtual sub-modules representing a keyboard, a pointer-pad and a screen can be manipulated and customized in an unprecedented way, thereby becoming a modular user interface system. The latter can be integrated into a thin client architecture scheme by making the most of all the available resources of this architecture which allow for the use of customized user interfaces operating within the same system as a single service.

Thin client systems works with user interfaces such as a mouse, a mechanical keyboard and a monitor. Thin client systems having, for example, single touch-screen interfaces represent solutions for simplicity, hygiene, visualization and information control. Touch interfaces supporting more than one touch or gesture at a time evolved into multi-touch-screens, allowing for the use of gestures and the fingers of both hands to interact with computers. These interfaces can be used instead of the keyboard. The interfaces provide a huge range of gestures that can now be used to provide a user-friendly way of interacting with computers.

The software for present-day computers was conceived to work with small pointing devices such as a mouse or a mechanical keyboard. The software application programs running, at present, in most operating systems, were designed and developed to be controlled by means of mouse and keyboard interfaces. Given the lack of space available, such applications are not ready yet to be operated entirely with one or more fingers. The size of a pointer cursor controlled with a mouse, on the screen, is about three pixels (very small indeed compared to a finger) and, therefore, fits perfectly to manipulate small and complex UT components. Consequently, touch-interface manipulation on present software applications is inaccurate. This is why the transition from mechanical to virtual user interfaces cannot be achieved with the exact same software platforms. Although some ideas and solutions, such as using stylus and other small-tipped elements, have been offered to solve this problem, many obstacles remain to be overcome in order to reach finger/hand operated interfaces with which to control software applications.

In one embodiment, a modular interface system configured to redistribute and increase the available areas in one or more computer devices featuring touch-sensitive interfaces, at the same time is described. These computer devices can be a personal computer, a mobile phone, a laptop, a Tablet PC, an ATM, a PDA, a UMPC, a touch-pad, a drawing pad, and any haptic computer adapted to known configurations such as tables, walls, boards, and desks. By integrating the said multiple devices through a centralized server and thereby operating in input and output collaboration, we are now increasing the available interactive perimeter. The modular interface system can be implemented as an interactive design tool allowing designers to provide custom interfaces, finger-friendly interfaces containing custom-made UT components with the proper size for finger manipulation or custom-made gestures to control software at a distance. Finger-bud oriented interfaces can be now distributed into multiple devices to control non finger-bud oriented applications; the UT components needed to operate a remote application are not located at the same application (or worst on top), they are now redistributed into input sub-modules 95 (an input sub-module 95 can be multiple input sub-modules 95 or a plurality of input sub-modules 95) in different devices.

The "Roaming Keyboard" concept describes a new user interface method resulting from the implementation of a user interface modular system obtained by combining both touch-sensitive and thin client technologies. "Roaming" is a general term used in wireless telecommunications and refers to the extending connectivity service in a location other than the home. Roaming can be implemented with virtual user interfaces, such as virtual keyboards transferred to different devices and connected via WIFI to a centralized thin client application server. In one embodiment, the user profile is located at the server and can be customized as required. When a user logs into a domain, the roaming user profile is downloaded from a domain controller server onto the local computer and applied in order to access his or her local files and settings. In another embodiment, the custom information downloaded takes place within a session environment, which means that the custom information is applied as soon as the user logs in. In some embodiments, the downloaded information is also customized according to user interface data. The downloaded information is used to determine virtual user interfaces running on at least one thin client terminal 93 which controls specific applications at the thin client application server.

The virtual devices are effectively integrated into the system as dynamic input-output sub-modules according to the thin client and touch-sensitive technologies. The roaming keyboard files 91 (a roaming keyboard file 91 can be multiple roaming keyboard files 91 or a plurality of roaming keyboard files 91) can be implemented using at least one thin client terminal 93 provided with a touch-sensitive interface, running a client processing module 94 capable of generating input sub-modules 95 and output sub-module 98, a customized set of transferable roaming keyboard files 91 ordered and categorized by user profile in a centralized thin client server system 90 and a relational database 101; a session layout module 92 where the type of interaction with the system is selected; and a custom thin client server 100 capable of coordinating and managing all the above elements, and capable of multiplexing the input and output messages allowing a modular collaboration between terminals.

Thin Client Terminals

Thin client terminals 93 include one or more network computers comprised of a touch-sensitive interface, a WIFI network interface 105 and hardware to store and run a client application module. They are designed to be especially small so that the bulk of the data processing occurs at the thin client application server, thereby saving energy and resources. In some embodiments, each thin client terminal 93 device includes a client processing module 94 running in a local application program as an embedded OS, capable of handling both downloaded roaming keyboard files 91 and thin client protocol simultaneously. The client processing module 94 reads the information contained in the roaming keyboard files 91 and frames the input sub-modules 95 and an output sub-module 98 for sending and receiving input and output information to the Client Server 100. The local application can be stored (among other methods) in a flash drive, in a Disk on Module (DOM) or even downloaded over the network at boot-up. Indeed, the said local application does not necessarily have to be executed within a network or thin computer. The application program can also be compiled as a setup installation file to be installed as a program in thick/fat computers. Therefore, known operating systems such as Windows™, Linux™ and MAC™ can also be utilized to run the system invention program with identical functionalities as in the thin client terminal 93 environment. The touch-sensitive interface and gadgets operating in the system are configured to accommodate many devices of various shapes and sizes including a cell-phone to a tabletop or even a media wall. The touch-sensitive interface equipped in thin client terminals 93 interprets hand and finger-bud gestures via mathematical algorithms.

Roaming Keyboard Files

The roaming keyboard files 91 are a set of files that contain customized user interface data information. They are transferred from the thin client application server (Client Server 100) to at least one thin client terminal 93 whose application determines the input-output sub-modules layout design, skinning, appearance, and behavior. Once downloaded; the roaming keyboard files 91 are applied by means of a client processing module 94 controlled by a local application program. The roaming keyboard files 91 can include file types such as XML files 120 or data files, SWIF or SWF files 121 and JAR files 122 or Java™ Archive files (JAR). To run these file types, a Flash Player program and a JAVA™ Virtual Machine program are embedded into the local application program that is written in C++ language. The XML files 120 store the sub-modules physical parameters and is also capable of passing dynamic data to the sub-modules by means of object tags. The SWF file 121 can be utilized by the system as a virtual keyboard sub-module 96, and the JAR files 122 can be utilized as a pointer-pad sub-module 97. As the application is capable of handling thin client protocol locally, the screen geometry can be controlled and manipulated according to the parameters stored in the XML files 120, which means that a screen virtual device is also a part of the puzzle adopted by the present invention as a virtual screen sub-module 99 and virtual output device. When the XML files 120 are downloaded and read by the client processing module 94 (that runs into the local application program), the input-output sub-module parameters such as size and position are set within the user interface module; then the sub-modules are created and the said file formats executed. The roaming keyboard files 91 can be generated by a session layout designer module configured to create and manage session layout templates. The purpose of the session layout designer module is to provide a tool for the users to create their own customized interfaces and files according to their needs or third party needs. Given that these files are administrated by the Client Server 100, it would seem best for them to be located at the same server. However, the files are also configured to operate efficiently when located at a different server.

Layout Session Module

As the system is based on the custom implementation of different dynamic interface components working together according to different user profiles, there is a need to establish a way of selecting the type of interaction with the system before operating it. For this purpose, a session layout module 92 is utilized. As an example, the session layout module 92 can include a session layout administrator form 103 (SLA form 103) associated with a computer interface. This is the case when a user decides the type of interaction with the system according to his/her needs. The SLA form 103 is prompted to the user while logging into the thin client system after he/she provides the proper credentials into the login form. The SLA form shows visual information about the type of interaction with the system, including: the configuration name and a written description of its function; the roaming keyboard files 91 utilized on each configuration, including layout design and skinning information; the applications running at the thin Client Server 100; and the thin client terminals 93 involved in each configuration. The user can navigate and select a proper configuration according to his/her needs. Once selected, the session starts and the elements are applied by the Client Server 100; the roaming keyboard files 91 are then transferred to the selected thin client terminals 93 and applied by the client processing module 94.

Thin Client Server or Custom Thin Client Server

In one embodiment, the custom thin Client Server 100 is a centralized network computing solution running on NX Technology, for example, consisting of a bitmap display technology commonly used to improve the performance of the native X11 protocol 153 to the point that it can be usable over a slow link such as a dial-up modem. NX compresses the X11 protocol 153 data to minimize the amount of data transmitted providing an agile framework to handle multiple terminals running on remote locations via WAN 112. The functionalities of this technology implementing the roaming keyboard files 91 described herein are used to create new ways of interacting with touch-sensitive devices, to control applications such as Linux™ remote applications and Windows™ applications. By means of an rdesktop 143, which is an open source Linux™ client for Microsoft's™ Terminal Services, NX technology can also handle proprietary Windows™ RPD protocol 155 (Remote Desktop Protocol). The system not only utilizes some great functionalities of the NX Technology but also adds new custom features (Multitouch, Multiplexing) integrating user interface information to the known structure of the architecture. Although some embodiments are implemented in NX technology, given its high performance and versatility when handling multiple protocols, there are also many other ways of implementation including with standard industry thin clients. Other thin client technologies such as VNC, RDP, Tarantella or CITRIX could also be used for providing the Output and Input services. In addition, the Input could be provided natively for the automation module.

Although the NX technology is known to be controlled and operated by means of mechanical interface devices—indeed, the NX Server is capable of shadowing sessions. Among other things, the thin client application server (Client Server 100) is adapted to transfer roaming keyboard files 91 to at least one thin client terminal 93 and multiplex the input-output message provided by at least one user allowing a modular collaboration between terminals. In order to execute the commands that are sent from the terminal input sub-modules 95, and from the output sub-module 98, the Thin Client Server system 90 contains two automation modules 142*a* (Linux™ compliant) and 149*a* (Microsoft™ compliant). These are located into different servers, the Client Server 100 (Linux™) and the Windows™ Server 147, both automation modules are utilized for receiving command information and apply it into the running applications. The Automation module (COM) 149*a* is capable of running automation protocols such as Microsoft™ Component Object Model (COM) and the Automation module (D-BUS) 142*a* is capable of running automation protocols such as Linux™ D-BUS. The Client Server 100 is also provided with a relational database 101 that stores all the information of the sessions plus the user interface data information ordered by session configuration layouts and user-groups profiles.

The downloaded and applied roaming keyboard files 91 on at least one thin client terminal 93 determine a variety of aspects of its dynamic alteration to operate different scenarios according to different user and group behaviour requirements. Among other things, regarding the at least one thin client terminal 93 these files determine: that the terminal is going to be engaged by the Client Server 100 to work independently or in input-output collaboration with at least another thin client terminal 93. The client processing module 94 layout disposition is within the perimeter of the touch-sensitive interface, i.e. portrait or landscape layout. The input sub-modules 95 and output sub-module 98 size, location, and position within the perimeter of the client processing modules 94 (a client processing module 94 can be multiple client processing modules 84 or a plurality of client processing modules 94). The input sub-module 95 and output sub-module 98 are stored in the downloaded and applied roaming keyboard files 91 in the form of programming language information capable of reacting to different layers of input prompts such as a simple touch, or movements and gestures with the fingers. The input sub-module 95 UT components contain a plurality of icons loaded with custom commands that affect the operability or the remote applications running from the Client Server 100. The input sub-module's 95 includes different gestures and custom gestures are oriented to cope with specific tasks determined by the user, whereby each gesture is loaded with custom commands such as the said icons. The sub-module 95 design and skinning information, i.e. the colors and forms of the said UT components.

Figure 1:
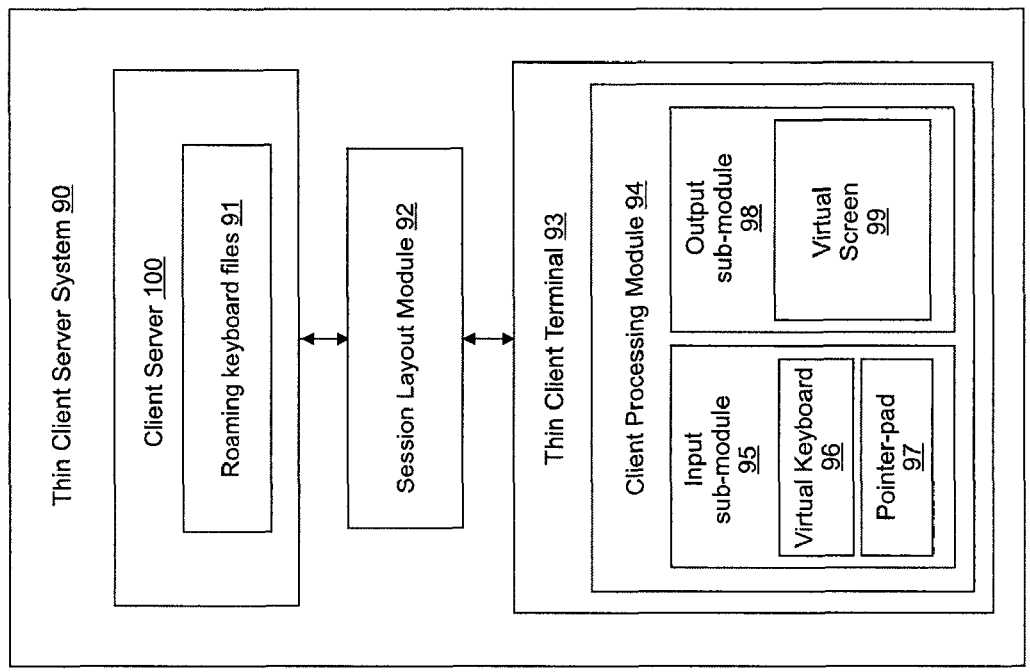
FIG. 1 illustrates a block diagram of the Thin Client Server System described in claim 1.

FIG. 1 illustrates a thin client server system 90 comprised of: a Client Server 100 configured to transfer at least one roaming keyboard file 91 to at least one thin client terminal 93 comprised of a touch-sensitive interface. A Session Layout module 92 can be configured to generate a selection configuration for selecting the type of interaction with the thin client server system 90. The selection configuration can include at least one roaming keyboard file 91 and session information such as remote applications, and a Client processing module 94 configured to apply to the at least one roaming keyboard file 91. The at least one roaming keyboard file 91 is implemented on the at least one thin client terminal 93 to dynamically generate: Input sub-modules 95 for receiving communication from at least one user 107, and an output sub-module 98 for generating output to at least one user 107. The generated input including: A Virtual keyboard sub-module 96, and a Pointer-pad sub-module 97. The generated output including a Screen sub-module 99 for generating output to at least one user 107.

FIG. 2 illustrates method for generating a virtual keyboard comprising the following five steps: 81) Selecting at least one roaming keyboard file from a session layout module 92, configured for selecting the type of interaction with the thin client server system 90. 82) Transferring at least one roaming keyboard file from a client server 100 to at least one thin client terminal 93 comprised of a touch-sensitive interface. 83) Applying at least one selected roaming keyboard file in a client processing module 94 which is running in a local application on at least one thin client terminal. 84) Dynamically generating input sub-modules 95 (input sub-modules 95 can be multiple input sub-modules 95 or a plurality of input sub-modules 95) and an output sub-module 98. The input sub-module 95 including, a virtual keyboard sub-module 96, and a pointer-pad sub-module 97. The generated output sub-module 98 including a virtual screen sub-module for generating output to at least one user. 85) Dynamically generating a virtual keyboard 85 utilized within the virtual keyboard sub-module 96.

Figure 3:
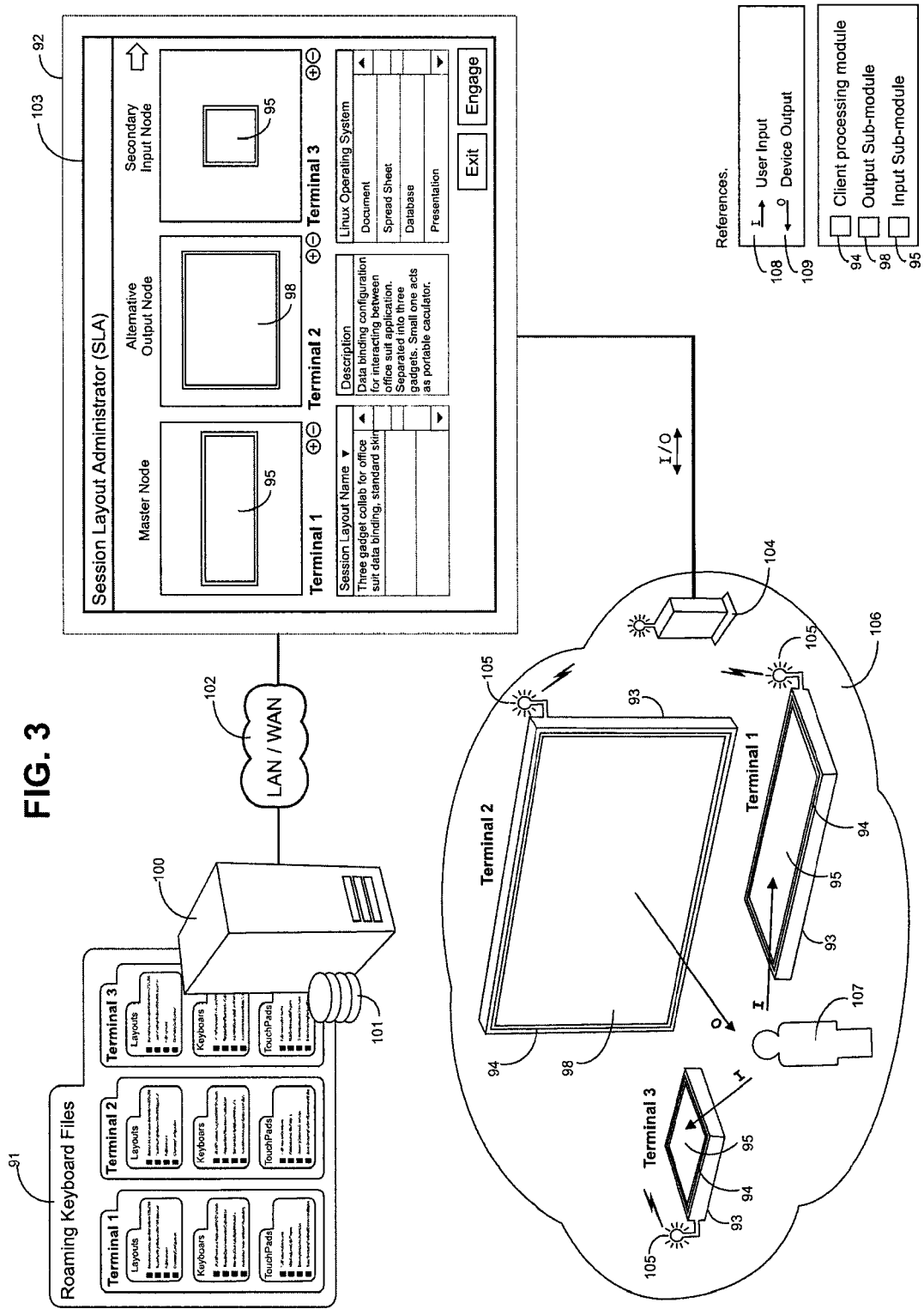
FIG. 3 illustrates one example of a network that incorporates the client server system according to an embodiment.

FIG. 3 illustrates user 107 operating the Thin Client Server System 90 described in FIG. 1. A Client Server 100 is the most important element of the system controlling all input/output communications with the user 107. The Client Server 100 is located in a LAN or WAN network 102 and provides both thin client service and user interface service by means of transferring and applying roaming keyboard files 91 into three different thin client terminals 93 labeled terminal 1, terminal 2, and terminal 3 acting in input/output modular collaboration. The three terminals are wirelessly connected to the Client Server 100 within the same network 106 by means a WIFI network interface 105 and a router 104, for example. The three terminals dynamically adopt different I/O roles according to the downloaded roaming keyboard files 91 selected in a session layout module 92 that can be a session layout administrator form 103 (SLA form). To display the different configurations to the user 107, the SLA form 103 queries a relational database 101 located at the client server 100 and renders visual information to the user 107 about the custom configurations stored to run on each session. Within the SLA form 103, each terminal is visualized as a thumbnail image where the roaming keyboard files 91 are rendered, the SLA form 103 also provides text information into UT components about the application programs and operating system to run in the session. Once the user selects a sessions layout configuration in the SLA form 103, the roaming keyboard files 91 are transferred to the said three terminals and applied by means of a client processing module 94 running at the local application program, the client processing module 94 frames and executes the roaming keyboard files 91 dynamically generating input sub-module 95 for user 107 to provide input information and output sub-module 98 to provide output to the user.

Figure 4:
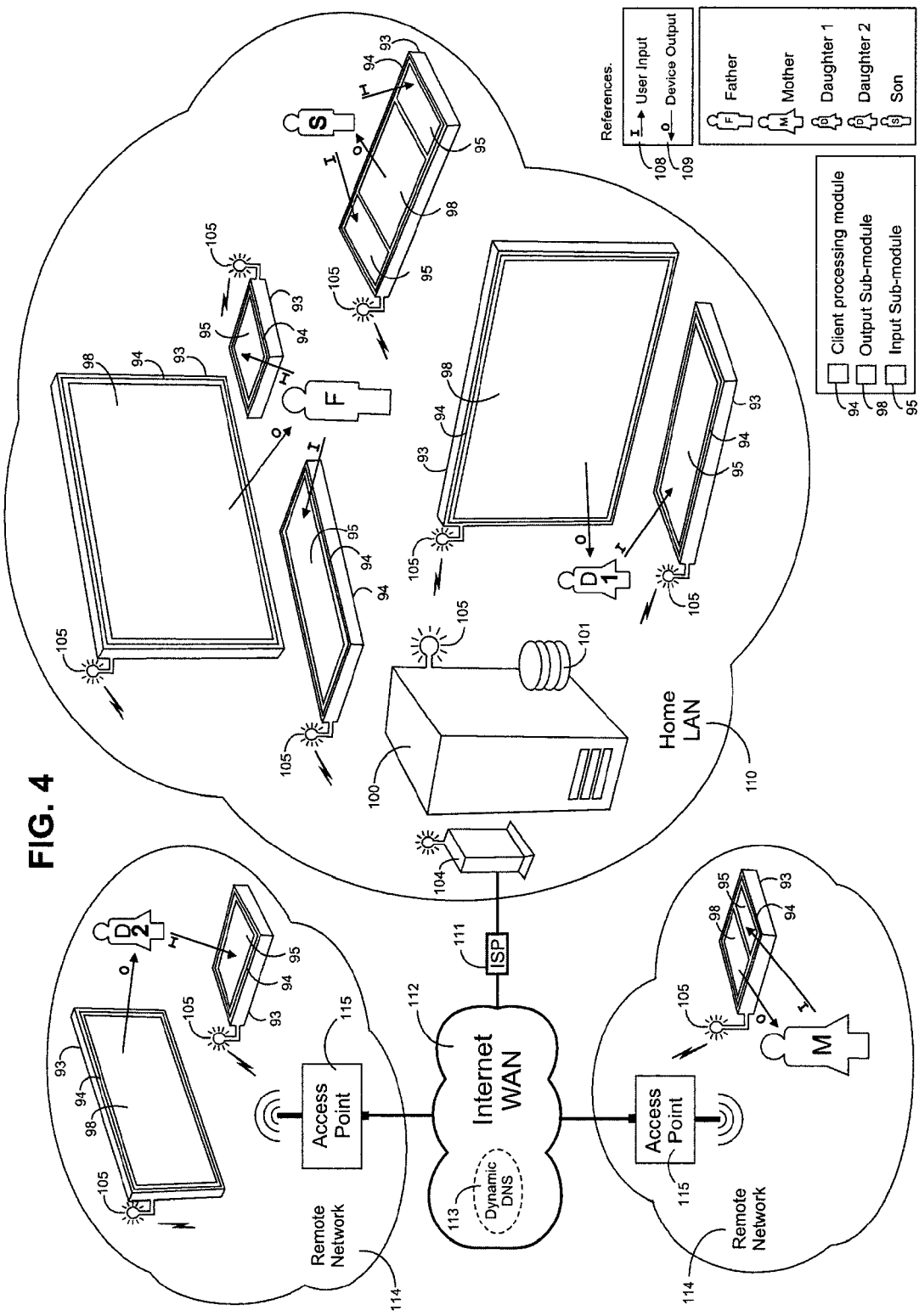
FIG. 4 illustrates how the present invention is utilized in a home environment providing service to the members of a family.

FIG. 4 illustrates the present invention providing computer service to the members of a family group compound of Father (f), Mother (m), Daughter 1 (D1), Daughter 2 (D2), and Son (s). All of the members circulate freely inside and outside the home in their every day life interaction with each other and exchange computer assets. In this case, the Client Server 100 is located at a safe place within home LAN 110, it is providing computer service to three of the members Father (F), Son (S), and Daughter 1 (D1) located in the house, and to other two members Daughter 2 (D2), and Mother (M) who are located outside the house on remote networks 114.

In the figure, three different form factor terminals 93 are clearly distinguished. A bigger terminal can have the size of a standard monitor, a middle terminal can have the size of a mechanical qwerty keyboard, and a smaller terminal can have the size of a PDA. All of them belong to the family group as computer assets utilized in different ways with changing roles according to each member needs. To achieve the type of interaction shown in the figure, each member has already logged into the system and chosen a different session layout configuration 136 (from the Session Layout Module 92 that can be a Session Layout Administrator form 103 of FIG. 6). Also the selected roaming keyboard files 91 have already been transferred from Client Server 100 and applied by means of a client processing module 94 that dynamically generated input sub-modules 95 and an output sub-module 98 on all the thin client terminals 93 utilized. At home, the terminals connect to the Client Server 100 by means of a WIFI network interface 105. While outside of the home on Internet WAN 112, the terminals connect to an Access Point 115 located at a remote network 114 and query a Dynamic DNS Server 113 that is capable of discovering the Client Server 100 IP Number assigned by the ISP 111. This way the terminals can circulate freely inside and outside home.

Figure 5:
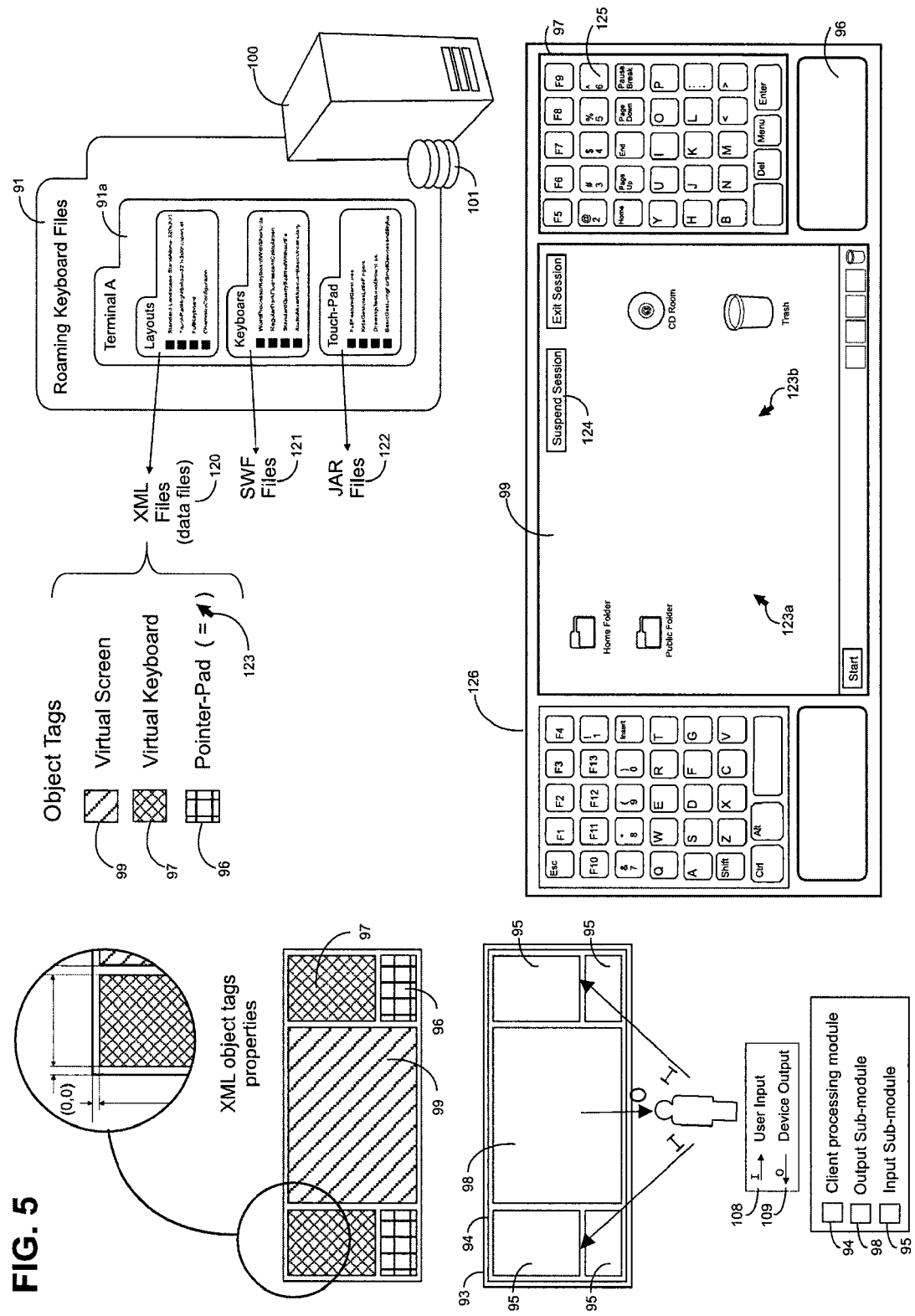
FIG. 5 illustrates the roaming keyboard file components, how they are structured with an example of how they can be applied to a single thin client terminal computer.

FIG. 5 illustrates how the roaming keyboard files 91 are applied in a thin client terminal 93 after being downloaded from the Client Server 100. The way the files are stored within the Client Server 100 can vary according to the type of implementation. In this case, the roaming keyboard files 91, whose URL paths are also stored in the relational database 101, are located in different directories ordered by terminal as shown in 91*a*. In some cases, the files are encoded into binary data and stored directly in the relational database 101, in which case the directory structure might differ from the one illustrated. Among the different formats included in the roaming keyboard files 91, the XML Files 120 (data files) are the most important ones. These data files contain all the layout information regarding the input and the output sub-module 98 that are dynamically generated on the terminals at runtime. A local application, written in C++ is capable of running a client processing module 94 that reads and applies the information contained in the XML object tags generating input sub-modules 95 and an output sub-module 98 (an output sub-module 98 for each session stored into the relational database 101 as a session layout configuration). Given that the client processing module 94 can handle NX remote desktop protocol locally, the Virtual Screen sub-module 99, located within the area where the user visualizes the output, is dynamically generated according to the parameters stored at the XML Files 120. The dynamically generated Virtual Screen sub-module 99 (equivalent to output sub-module 98) is capable of receiving touch input and gesture input just as any other thin client architecture output screen, meaning that the input sub-modules are not the only sub-modules that allow user input. On the other hand, the input sub-modules 95, utilized as virtual input devices, are executed in two different formats that can run with additional components. For this purpose, the local application can contain an embedded Flash Player component and an embedded JAVA™ Virtual Machine component. Both additional components can be manipulated by the client processing module 94 according to the information read from the XML Files 120. In this case the Flash Player component is utilized by the client processing module 94 for executing the downloaded SWF Files 121 as Virtual Keyboard Sub-module 96, and the JAVA™ Virtual Machine component for executing the downloaded JAR Files 122 as Pointer-Pad sub-modules 97 respectively. Among other functionalities, these two file formats comply with two basic tasks: on the one hand, storing programming language information for specific profile use and on the other, turning the stored information into commands which control the remote applications running at Client Server 100.

After the roaming keyboard files 91 are executed and the input sub-modules 95, and the output sub-module 98 are dynamically generated, the thin client terminal 93 is ready to be operated by the user as shown in 126. The NX protocol is transferred from the Client Server 100 to the Virtual Screen sub-module 99 providing remote desktop applications with multipoint support. Two pointers 123*a* and 123*b* are created for each Pointer-pad sub-module 97 generated. The user can then interact with the thin client terminal 93 providing input into the input sub-modules 95, triggering commands to the Client Server 100. The user can touch the virtual keyboard buttons 125 contained in the Virtual Keyboard sub-module 96, by utilizing the multipoint interactive tool in the Pointer-pad sub-modules 97 or by providing gesture input into any of the input sub-modules 95. As a result of the provided input, the user can visualize the output on the Virtual Screen sub-module 99. For the user to be able to finish using the system, a Suspended Session button 124 is utilized for suspending the ongoing session and giving it a name. This way, the user can later resume the suspended session, including the roaming keyboard files 91, thereby keeping the session layout "alive" in the exact same way as it was left, i.e. with the exact same layout design and applications running. Regarding the way the roaming keyboard files 91 shown in the figure are utilized by the system invention, a very basic implementation can be, however, accomplished without the use of additional components running SWF files 121 and JAR files 122. Instead, native C++ programming language files replace those formats that perform the exact same task, after being downloaded from the Client Server 100. In this case, the client processing module 94 renders the input and output modules locally according to the information stored in the XML Files 120, plus C++ dynamic libraries replacing the said formats.

The pointer-pad sub-module 97, can be configured to provide a multipoint interactive tool means that every time that the roaming keyboard files 91 are downloaded from the Client Server 100 to at least one thin client terminal 93. At least one pointer-pad sub-module 97 is dynamically generated, a new pointer is created at an Operative System Application level by means of software in both Linux™ and Windows™ sessions. This can be shown in FIG. 5 123*a* and 123*b*, for example, where a new pointer is shown on each touch-pad created. To handle this functionality the Windows Server 147 and the Client Server 100 are equipped with different multipoint tooling. When the session runs Linux™ applications, a Multi-Pointer module 142*b* applies a software called MPX (Multi-Pointer X Server) to provide the multipoint interactive tool. This is accomplished by making the NXAgent 145 multipoint X compliant, i.e. that an adaptation of the NXAgent 145 is developed to support MPX software on the X-Client 141 session. However, when the session runs Windows™ applications, a different MultiPoint module 149*b* applies a Microsoft™ Windows MultiPoint technology. Although this technology was created to enable multiple users to share a single PC using multiple mice or other peripherals and was also used to provide multipoint tools to touch-sensitive devices, it is implemented in one embodiment to provide the said multipoint interactive tool while running Windows™ applications.

Figure 6:
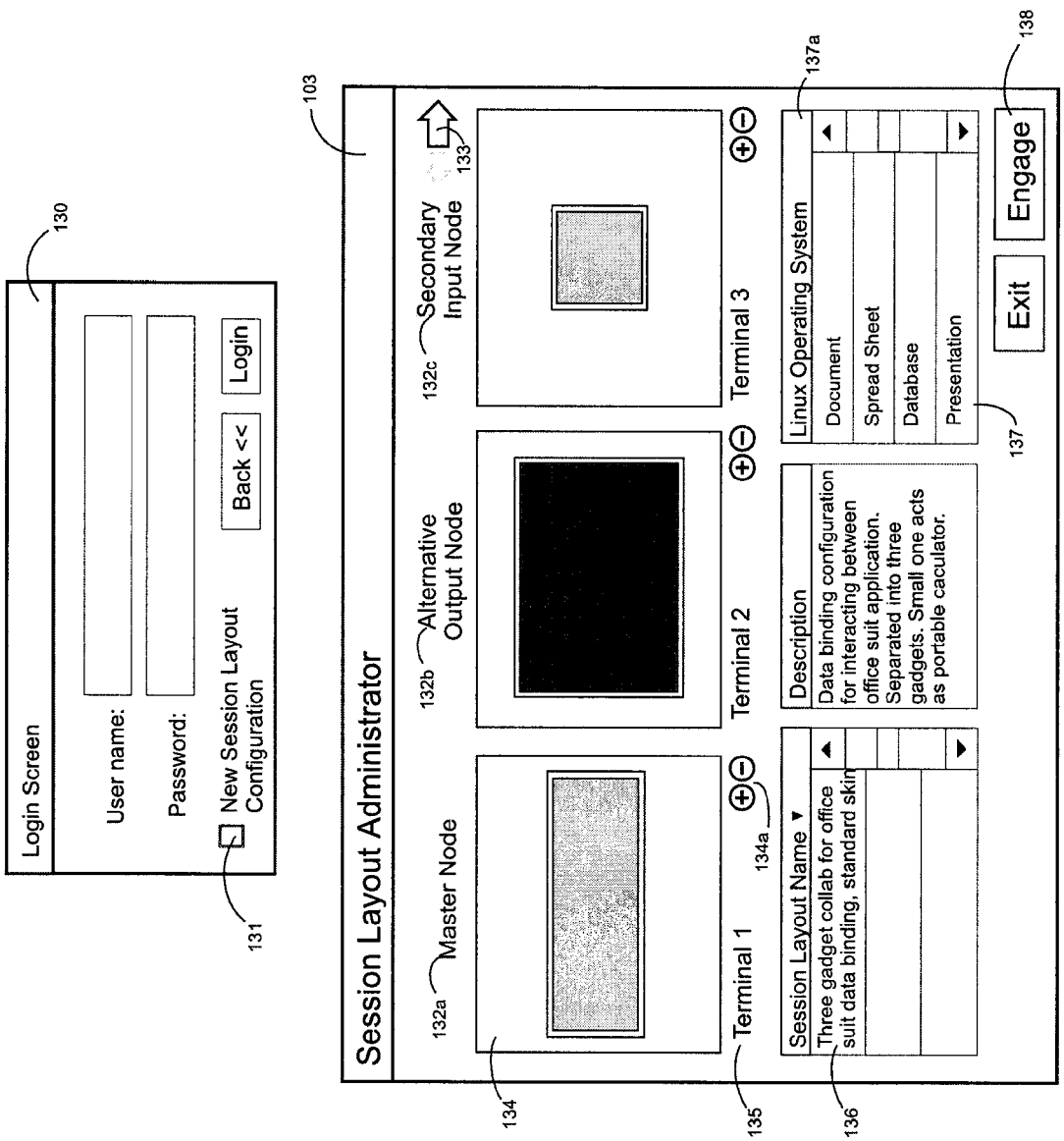
FIG. 6 illustrates the Login Screen form and the Session Layout Administrator form (SLA).

FIG. 6 illustrates the Login form 130 and the Session Layout Administrator form 103. The Login form 130 is prompted to the user while logging into the system. A floating virtual keyboard (not shown in the figure) is used by the user to fill the input texts with text information and log in. At this point of the session, the user can decide whether to utilize a known session layout configuration, or to create a new one by checking the New Session Layout Configuration checkbox 131. If this is the case, a session layout designer module that can be a session layout designer program is started. With this program, the user can create a new session layout configuration and store it in the relational database 101, including roaming keyboard files 91, to run it later as many times as desired. The Session Layout Administrator form 104 (SLA form 104), which is one way of implementing the Session Layout Module 92, is prompted to the user right after providing the correct credentials into the login form. The SLA form 104, however, has extended functionalities that determine the type of interaction between the user and the system, such as which terminals to utilize, the roaming keyboard files 91 to download and the applications to run.

Continuing with the illustration in FIG. 6, the SLA form 104 queries the relational database 101 located at the Client Server 100 requesting all the available session layout information according to the user name and the terminal utilized (in this case the Master Node terminal). Once the information is obtained, it is rendered into the UT components and ordered into three columns 123a, 123b, and 123c. Each column represents a different terminal 135 allowing an accurate visualization of the terminal roaming keyboard files 91 in different thumbnails 134. If further details regarding the files should be required, the user can pan and zoom the thumbnails by means of Zooming Tool buttons 134a providing important information concerning the aspect and layout information of the rendered files. A Session Layout selector list box 136 is utilized to navigate between each session layout configuration at the time. Whenever the user changes this component item, all dependent components of the form are updated with data of the contiguous session layout. An Application list box 137 shows the applications running in the session and the Operating System 137a utilized. While the design and functionality of the SLA 103 allows a proper selection of components included on each session layout configuration 136, there are several design approaches that can be implemented to comply with the same goal.

The use of many terminals simultaneously in collaborative mode allows for greater and improved interaction with one or more users. For this to take place in an orderly manner, the system identifies the role played alternatively by each terminal. When a terminal starts up, it automatically connects to the server and the terminal is then ready to be operated and holds in wait for a stimulus. In one embodiment, the user starts operating the terminal thereby turning it into master node. In another, the terminal is ordered by the Client Server 100 (with an engage command) to act as slave to another master node terminal session. Once the user starts operating the terminal as master node and logs in, the SLA form 104 is prompted, which offers the possibility of selecting other terminals to operate in different ways. For this purpose, the SLA form 104 is divided into different columns that provide visual information regarding the roles to be played by each terminal. Master Node 132a column, for example, always provides visual information regarding the terminal operating as master. This column contains visual information since the SLA form 104 queries the relational database 101 for all the available information when the actual terminal is acting as master node. The user, for example, might want to use the master node as an input sub-module 95 or more precisely as a virtual keyboard sub-module 96. If the user wants to visualize the output provided at the master node on a different terminal, on a bigger screen terminal for example, he/she will select a session layout configuration 136 containing visual information at the Alternative Output 32b column. Moreover, if the user wants to utilize a third terminal to provide extended input, a calculator chord for triggering custom calculations, for example, he/she selects a session layout configuration 136 containing visual information in the Secondary input 32b column. Advanced users, such as various people utilizing multiple terminals in collaboration simultaneously, would require the use of the pagination button 133, which provides further input nodes (third, fourth, fifth nodes and so on).

Once the session has started and the thin client terminals 93 have been allocated a previously selected role with the SLA form 104, the user can operate the system. However, if the user decides to integrate or invoke a new terminal, to invite another user to participate in the ongoing session with another device, for instance, an invoke terminal form is prompted (not shown in the figures). The invoke terminal form is similar to the SLA form 104 but features a single column only and a description of its functionality. If, on the other hand, a layout configuration has started but one of the terminals involved in the session needs to be removed, a release terminal form is utilized, consisting of a very basic form that lists the terminals that can be removed (other than master nodes and alternative output nodes). The user can then select a terminal and release it from the session. Both these forms provide additional functionality to the SLA form 104 and allow dynamic changes to be applied to session layout configurations without the need to end the ongoing sessions.

As the system supports more than three simultaneous terminals running in a same session, a pagination control button 133 can show the next three terminals if available. Once the user has decided which configuration to utilize in 136, he/she can press the engage button 138. Then, the selected information is sent to the Client Server 100 which transfers the selected roaming keyboard files 91 to the selected terminals involved in the session.

Figure 7:
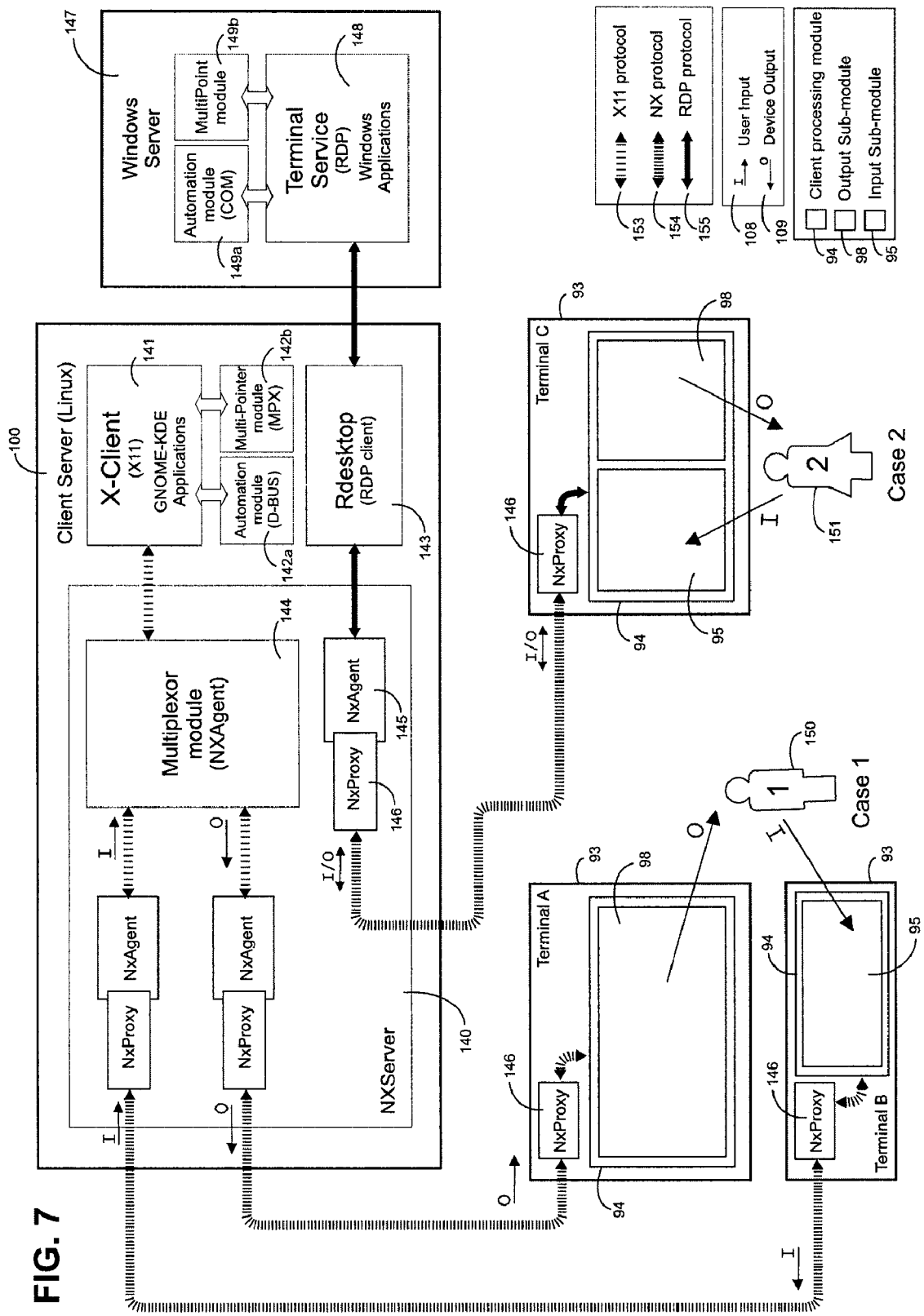
FIG. 7 illustrates one type of software configuration utilized showing the applications running in the client server and in the thin client terminals, how the input and output message is multiplexed and handled to provide both Linux™ and Microsoft™ application servers. The Windows™ Server 147 can run in a different computer or in the same computer as the Client Server 100 into a virtual machine software.

FIG. 7 illustrates one embodiment of a drawing of how software is implemented to operate the roaming keyboard files technology disclosed in two distinct cases. Both cases suppose that the roaming keyboard files 91 have been already downloaded and applied by the client processing module 94 located at the terminals, dynamically generating input sub-modules 95 and the output sub-module 98. Case 1, provides modular collaboration between Terminal A (acting purely as an output device) and Terminal B (acting purely as an input device) by applying multiplexing functionalities to control Linux™ remote desktop applications. User 1 150 provides input 108 into the input sub-module 95 generated at Terminal B, and receives output 57 from the output sub-module 98 generated at Terminal A. Case 2, provides modular collaboration within the same Terminal C (acting both as an input and output device simultaneously) without applying multiplexing functionalities to control Windows™ remote desktop applications. User 2 151 provides input 108 into the input sub-module 95 generated at Terminal C, and receives output 109, in the same terminal, from the output sub-module 98.

To cope with the aforementioned two cases, the NX Technology is used in combination with the roaming keyboard files 91 technology disclosed. An NXServer 140 located at the Client Server 100 running a Linux™ OS is capable of handling all the input and output information 108-109 distributed into at least one thin client terminal 93 by means of an I/O user interface modular system. By applying a Multiplexor module 144 to one or more NXAgents 145 the NXServer 140 can handle input/output modular collaboration between terminals when required (as in Case 1). The NXServer 140 utilizes NX protocol 54 that handles Linux™ remote X Windows™ System connections against an X-Client 141, greatly improving the performance of the native X11 protocol 55 by means of two NXProxy's 146 located at both ends of the communication. These two ends are connected by means of an SSH protocol with a tunnel created with SSH public key method. At the terminals, the NXProxy 146 is connected to the client processing module 94 handling communications with the input sub-modules 95 and the output sub-module 98; at the server it is connected to an NXAgent 145. Although it is designed primarily to optimize X11 sessions, the NXServer 140 can be configured as a proxy server to tunnel Remote Desktop. Protocol RDP protocol 155, in which case, an Rdesktop client 143 is utilized as a bridge to connect the NXServer 140 and a Windows™ Server 147 running a Terminal Service 148 providing Windows™ applications (as in Case 2). Although FIG. 7 shows the Multiplexor module 144 only applied to the Linux™ X-Client 141, the present invention is also capable of performing the same collaborative functionality applied to the Terminal Service 148 through the Rdesktop 143. The Windows™ Server 147 can also run in a different computer or in the same computer as the Client Server 100 into a virtual machine software.

In order to control the remote applications running on both X-Client 141 (Linux™ case) and Terminal Service 148 (Windows™ case), by applying the commands triggered from the input, sub-modules 95 dynamically generated on at least one terminal, two extended modules are utilized for each display protocol used (X11 protocol 153 and RPD protocol 155). An Automation module 142a running on the Linux™ Client Server 100 and a different Automation module 149a running on a separated Windows™ Server 147 where the Terminal Service 148 also runs. Although they accomplish a similar task, which consists of listening to the input command message received from the NXServer 140, and applying it to the application running, the Automation modules are based on two different application control technologies. The Linux™ Automation module 142a is built on application control software that can be the D-BUS program, which offers a simple way for applications to communicate with one another. The Microsoft™ Automation module 149a is built on a Component Object Model (COM), which is a standard interface for software componentry. Although these two technologies accurately perform remote automation, they might be replaced with other available technologies that could perform the same or better. The way the input sub-modules 95 connect to both Automation modules 141 and 148 deliver remote application control commands, could vary according to the type of implementation. As the input commands, sent from the input sub-modules 95 to the automation modules 142a and 149a, are custom commands this means that very simple input messages can trigger multiple and complex algorithms applied by the automation modules 142a and 149a in the running applications. In the case of a direct socket connection between the input sub-modules 95 and the Automation modules 141 and 148, it would act as a socket server. In this case, the input commands would be set outside the SSH tunnel created between the NXProxy's 146 and therefore outside the NXProtocol 154. Although it is possible to obtain good results by using this implementation, it is not as secure and stable as if the input messages where tunneled.

Once the at least one thin client terminal 93 is turned on, it starts up, connects to the network, and establishes an automatic and secured connection with the Client Server 100. The at least one thin client terminal 93 is now ready to be operated by at least one user independently or in input-output collaboration with at least another thin client terminal 93. The user selects a thin client terminal 93 by providing touch input into the touch-sensitive screen. The selected thin client terminal 93 then becomes master node to the system. Within the master node terminal touch-sensitive screen, the Login Form 130 is prompted to the user to provide proper credentials. Once this is done, the Session Layout Administrator form 103 is prompted for the user to navigate and select a proper session layout configuration comprised of at least one roaming keyboard file for the thin client terminal 93 being operated as master node and for at least another thin client terminal 93 acting as slave node and at least one application to run with Windows™ or Linux™ Operating System. Once selected and confirmed, this information is sent to the Client Server 100 as an ID for the session layout configuration stored into the relational database. The Client Server 100 then transfers the roaming keyboard files 91 to the master node terminal and to at least one slave node terminal involved in the stored session layout configuration. A client processing module 94 applies the downloaded roaming keyboard files 91 to dynamically generate input sub-modules 95 to communicate with/to interact with/to receive information from at least one user and an output sub-module 98 for generating output to at least one user. Once the sub-modules are created, the Client Server 100 engages the selected terminals as slave nodes into the same session started by the master node terminal.

Once the sub-modules are applied and the session started, the at least one user can operate the at least one thin client terminal 93 in modular collaboration. The at least one user provides input into the input sub-modules 95. the provided input is then turned into an input message containing the command information to control the remote applications. The input message is handled by the user interface module and sent to the Client Server 100 through the network. The Client Server 100 receives the input message and runs the command it contains, thereby controlling and affecting the remote application by means of an automation module running at an Operating System level. The input message is turned into an output message; it is then multiplexed and sent from the Client Server 100 through the network to the thin client terminal 93 into the user interface module containing the output sub-module 98. The at least one user then visualizes the output message on the output sub-module 98 as the result of the provided input into the input sub-module 95, given that the at least one thin client terminal 93 runs in module collaboration.

Figure 8:
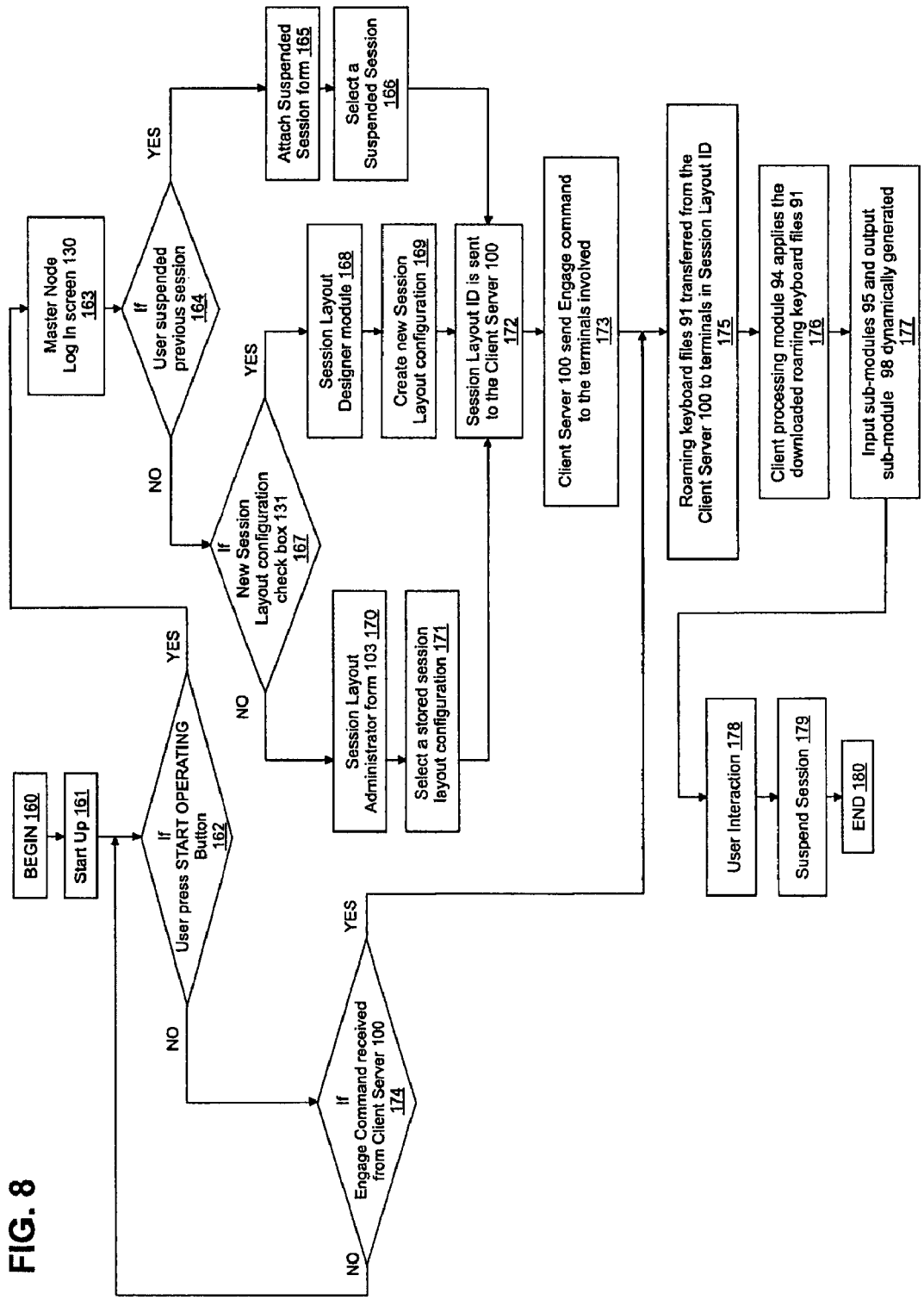
FIG. 8 illustrates a simplified flow chart of the operational sequences how the roaming keyboards are distributed from the custom client server to the thin client terminals.

FIG. 8 illustrates a simplified flow chart of the operational sequence relating to how the present invention handles the roaming keyboard files 91 disclosed. At the BEGIN block 160, the at least one terminal 93 installed in the system is turned on and Starts Up at block 161. Throughout this process, the at least one terminal 93 connects automatically to the Client Server 100 by establishing an SSH tunnel created with an SSH private key method. After start up, a START OPERATING button is displayed on the touch-sensitive screen and the at least one terminal 93 remains waiting for a Client Server 100 Engage call (or command). If the user chooses to operate a terminal and press the START OPERATING Button at block 162, the terminal becomes Master Node to the system and a Login Screen 130 is prompted to the user at block 163. The user provides the right credentials and logs in. The system checks if the user has a previously stored suspended session at block 164. If such were the case, the user is prompted with an Attach Suspended Session form at block 165 and selects a Suspended Session at block 166. If no session was stored previously, the system verifies if the New Session Layout Configuration check box 131 (FIG. 6) was checked in the Login form 130 at block 167. If the check box 131 was not checked, a Session Layout Administrator form 103 is prompted to the user at block 170, and the user selects a stored session layout configuration at block 171. If the previous New Session Layout Configuration check box 131 was checked in the Login form 130 at block 166, a Session Layout Designer module, that can be a Session Layout Designer form, is prompted to the user at block 168, and the user creates a new Session Layout configuration at block 169. By means of operations in blocks 166, 169, and 171a Session Layout ID (number stored at the relational database 101 containing all the session layout configuration information in one ID number) is sent to the Client Server 100 at block 172, which then queries the relational database 101 and sends an Engage command to the terminals involved at block 173. The terminals are not used as master node by the user while starting the session wait for the Client Server 100 to receive an engage command. If the Engage Command is received from the Client Server 100 at block 174 to the terminals, the roaming keyboard files 91 are transferred from the Client Server 100 to the terminals present in Session Layout ID at block 175 (master node terminal included). Once downloaded, a Client processing module 94 applies the downloaded roaming keyboard files 91 at block 176, and Input sub-modules 95 and an output sub-module 98 are dynamically generated at block 177. The user can now interact with the system at block 178 providing input into the input sub-modules 95 and receiving output from the output sub-module 98. Once finished, the user Suspends the session at block 179 and gives it a name in order to identify it when resuming work.

The fact that the roaming keyboard files 91 are ordered into the Client Server 100 directories, and that those directories can also be accessed by web servers such as the Apache Server for example running in the same Client Server 100, and that there is a relational database 101 capable of receiving connections from various types of clients, provides an excellent opportunity to apply the invention in a web oriented way. This means that instead of using a local application for handling a client processing module 94 that would frame and execute the roaming keyboard files 91 as already mentioned above, one could consider using a web browser. Therefore, any thick/fat computer comprised of a touch-sensitive interface capable of running a web browser could be used as a thin client terminal 93 to operate the system. However, the said files would need to be modified in order to be executed by means of web page codes and tools such as applets and browser plug-ins to cope with the invention's requirements and to become NX compliant. Given that web browsers can execute HTML code (HyperText Markup Language) natively and are capable of storing data in the form of tags, the already mentioned XML Files 120 or data files, read by the client processing module 94 to frame the input-output sub-modules are replaced in the web browser implementation by an HTML file. The fact that the invention utilizes a local application written in C++ that handles NX remote desktop protocol and virtual screens natively, something a web browser can certainly not do, means that an extra file needs to be added to the roaming keyboard files 91 in order to provide a virtual screen (virtual screen sub-module 99) while the invention is framed and executed with a web browser. The additional file format could be either a JAR file 122, running in a virtual machine or an SWF file 121, running in a Flash Player. This way the web browser application can replace the client processing module 94 in order to frame and execute the adapted roaming keyboard files 91 (NX compliant files set) that contain HTML files (instead of XML files 120) and extra SWF files 121 or JAR files to provide an output sub-module 98. This way the present invention framework can be utilized from web browsers providing the same service.

The roaming keyboard files 91 are ordered and categorized, within the Client Server 100, thereby constituting a roaming keyboard bank utilized as an interface repository, according to two main aspects. One aspect is the available hardware installed in the system. The other aspect relates to the type of users and group profiles that use the system in their daily life. In order to handle and support all this information working together as a unit, and provide a service aimed at fulfilling every need, a relational database is capable of storing all the relations between the different elements that compose each session layout configuration. Broadly speaking, a session layout configuration contains all the elements involved in a session running within the frame of the invention and is selected by the user while logging in. The elements involved include the aforementioned roaming keyboard files 91. The dynamics according to which the invention uses these files, added to the invention's capacity for scalability, allow the system to support an exponential growth of roaming keyboard files 91. This also means that the invention can be interpreted and seen as a user interface bank, or more precisely a roaming keyboards bank, capable of storing as many user and group profile files as possible, thereby controlling as many remote applications as possible. Since the purpose of the invention is to provide a wider service, it also encourages such a development both by its owner and by a third party. Therefore, popular formats such as SWF files 121 and JAR files 122 are used for people with minimum programming skills (such as web developers) to develop their own user interfaces, for themselves or others, and to make them run with the system, thereby providing an interface tool.

In order to enhance the above mentioned development and to allow the user to create his/her own custom session layout configurations, the invention includes a session layout designer module, such as a session layout designer program associated with a computer device (not shown in the figures). This designer program is configured to create and manage session layout templates which enable the manipulation of the properties and parameters of the client processing module 94, the input sub-modules 95, and the output sub-module 98. It also permits the composing of roaming keyboard files 91 to be constituted. The designer program is configured to create and store data files, such as XML files 120, containing the size and location parameters of the input sub-modules 95 and the output sub-module 98. However, proprietary files formats included within the roaming keyboard files 91 such as SWF files 121 and JAR files 122, are only configured by the designer program. In the case of the data files, since the same parameters that the client processing module 94 reads while applying the roaming keyboard files 91 after being downloaded into at least one thin client terminal 93 are the ones to be created and stored by the designer program as layout information, the same practice is applied when creating and writing the data file. Regarding the rest of the information contained within each session layout configuration, the designer program connects to the Client server 100 relational database 101 and performs queries, updates and inserts.

To accomplish the aforementioned features, the designer program is divided in three sub-programs. 1) The Session Layout Administrator form 103 used in CRUD mode, with additional GUI's used as wizards to make a proper selection of the elements included in a session layout configuration such as selecting the thin client terminals 93 to operate within a given session layout configuration. 2) A creator sub-program with a working area, which handles measures and dimensions, where the sub-modules can be resized and edited by manipulating figures, vectors by means of graphical tools. 3) A composer sub-program for composing SWF files 121 and JAR files 122 within the input sub-modules 95, where the user can choose between a large scope of icons, UT components, and gestures, all of them containing different commands and functions. This information is stored in the database and includes the parameters enclosed within the relational database 101. In this embodiment, the composer only creates the content of the file as opposed to the actual file format. The said content is then stored within the database. In practice, once they are downloaded into at least one thin client terminal 93, the files query the relational database 101 in order to build their UT components and load the commands according to the information stored within the Client Server 100. In one embodiment, the programming software contained in these files applies a factory design pattern to build the UT components stored as string value in the relational database 101.

The client server system 90 and method incorporates rich and dynamic touch-sensitive interfaces to dynamically create virtual devices to interact with one or more users. The lack of tactile feedback has long been a usability issue with tablet PCs, ATMs and other touch-sensitive interface devices. Pressing a physical button on a qwerty keyboard seems by far a much better experience for the user than doing it on an onscreen virtual button. If a user of a qwerty mechanical keyboard had to input text into a computer by means of a virtual keyboard on a touch-sensitive interface, he/she would literally need to learn how to type again. In fact, he/she would have opposite tactile feedback needs that cannot be replaced with a flat surface just as it is. Based on this problem, prior art solutions have effectively provided tactile feedback on a touch-sensitive interface. One solution consists of a flexible screen controlled by physical actuators that generate controllable protuberances on it. The latter can be raised and lowered over the flexible surface at different locations within the touch-sensitive perimeter. When a certain voltage is applied, the protuberances raise from the surface with increasing extent, providing the feel of tactile elements on the touch-sensitive screen. In order for the present invention to be a complete user interface solution, a tactile feedback method, such as the one described, is needed to be integrated and supported. In this case, the roaming keyboard files 91 could contain extra information regarding the specific location of the physical actuators that should be raised. Since the roaming keyboard files 91 already store the exact location of the plurality of icons contained within each virtual keyboard sub-module 96, once they 91 are downloaded, the client processing module 94 would read that information and send it to the driver that controls the actuators. Thanks to the implementation of a tactile feedback method, when the user presses a button, he/she can feel something equivalent to a button press or release.

Continuing with the use of haptic interfaces, it is not compulsory that all of the thin client terminals 93 used within the Thin Client Server system 90 are equipped with a touch-sensitive interface in order to operate the present invention. In some cases, wide TV screen devices or projectors with bigger aspect ratios already provide entertainment or information services for one or more people within the home, office or other facilities. This is a unique opportunity to integrate them into the system and include other available screens of smaller aspect ratio. For this purpose, a Bridge terminal containing the exact same hardware as all the other thin client terminals 93 of the invention but without the touch-sensitive interface (a smaller device), is connected to the screen devices involved and to the Client Server 100 at the same time. The Bridge terminal acts as a bridge to provide a Virtual Screen sub-module 99 (pure output) to a user while also providing input into another thin client terminal 93, connected to the TV or projector by means of plugged cable video connectors or wireless protocols, and to the Client Server 100 by means of the WIFI network interface 105.

Figure 9:
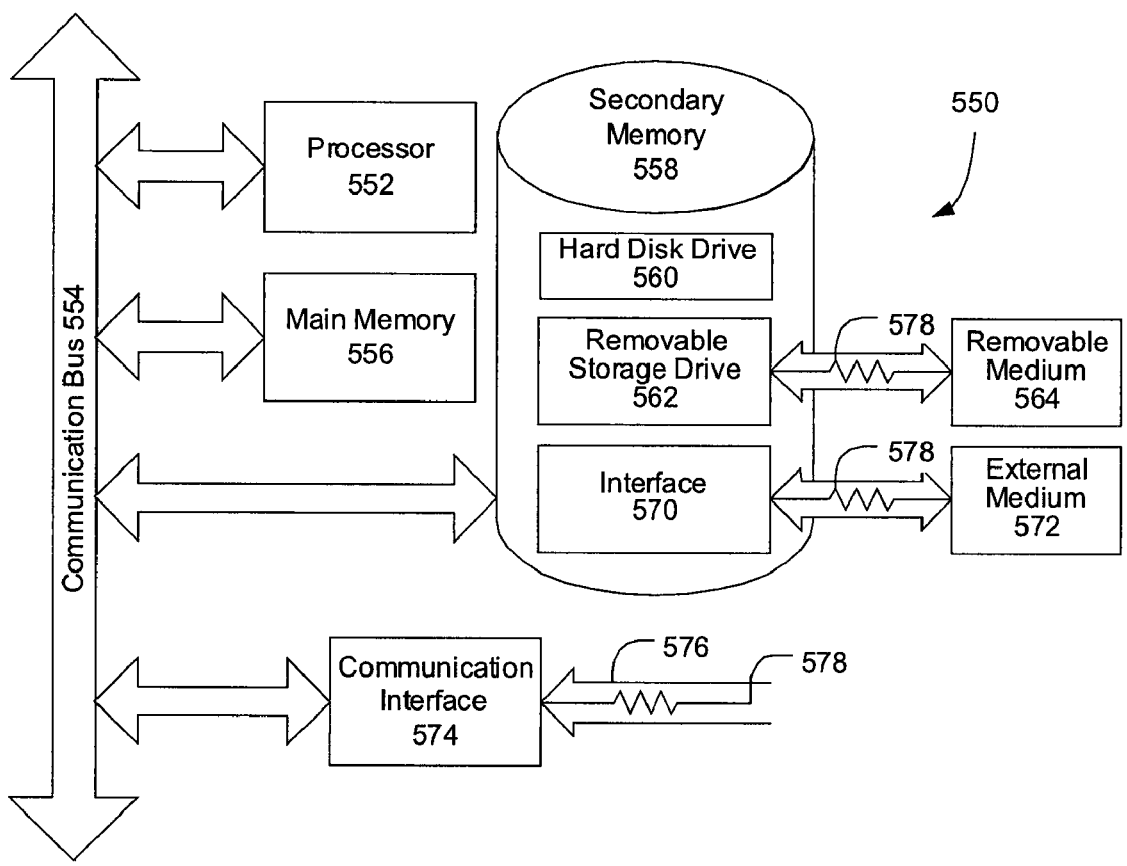
FIG. 9 is a block diagram illustrating an example computer system that may be used in connection with various embodiments described herein.

FIG. 9 is a step diagram illustrating an example computer system 550 that may be used in connection with various embodiments described herein. For example, the computer system 550 may be used in conjunction with the thin client server system 90 previously described with respect to FIG. 1. Other computer systems and/or architectures may also be used as will be understood by those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Although the present invention was conceived and designed to be utilized in thin client architectures, it can also be applied in different architectures with the right adaptations. In fact, the invention can be adapted to remotely control thick/fat computers by making adjustments on some of the modules and removing some features utilized in thin client architecture. For example, if the Automation modules 142a-149a (FIG. 7), which are executable programs, are placed and executed in a thick/fat computer containing a Windows™ Operating system (for 149a COM) or Linux™ Operating system (for 142a D-BUS), automation modules 142a and 149a receive remote connections and control the ongoing applications. In addition, if the client processing module 94 is executed in another computer (a second computer), comprised of a touch-sensitive interface, and the SWF files 121 and JAR files 122 (FIG. 5) modified in order to connect to the thick/fat computer containing the automation module, when the roaming keyboard files 91 are downloaded, framed and executed by the client processing module 94 and the input sub-modules 95 generated, the thick/fat computer can be operated remotely from the touch-sensitive computer (second computer). Furthermore, automation modules 142a and 149a can connect simultaneously to different remote computers thereby enabling the equipment to be shared.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A thin client server system comprising:
   a client server configured to transfer input-output files to at least one thin client terminal to:
   generate, input sub-modules for receiving communication from at least one user, and an output sub-module for generating output to at least one user, the generated input sub-module including, a virtual keyboard sub-module and a pointer pad sub-module, the pointer-pad sub-module configured to generate a multipoint interactive tool to receive a gesture input, the generated output sub-module including a virtual screen sub-module for generating output to at least one user, the client sever configured to allow modular collaboration while multiplexing input and output message between sub-modules.

2. The thin client server system of claim 1, in which the thin client terminal comprises one of a single touch-sensitive interface and a multi touch-sensitive interface.

3. The thin client server system of claim 1, in which the client server is further configured to transfer one of input-output files to the at least one thin client terminal to generate a selection configuration at the at least one client terminal for selecting the type of interaction with the client server system.

4. The thin client server system of claim 3, in which the selection configuration comprises a session layout module.

5. The client server system of claim 3, in which a relational database coupled to the client server is configured to store a suspended session, the stored suspended session configured to support selected information previously selected according to the selection configuration.

6. The thin client server system of claim 1, wherein the virtual keyboard sub-module comprises one of a player object and a virtual machine object, the virtual keyboard sub-module configured to receive a gesture input.

7. The thin client server system of claim 1, further comprising a relational database coupled to the client server, the relational database configured to store standard session information including one of session name, display area, and applications running for each session, user interface information stored by a means of the said roaming keyboard files location including binary data, hardware information stored as thin client terminals address hardware setup and miscellaneous information about the group or entity utilizing the system and a combination thereof.

8. The thin client system of claim 1, wherein the sub-modules are configured to change size and position.

9. The thin client system of claim 1, in which the input sub-module is configured to add one or more new terminals to an ongoing session.

10. The thin client system of claim 1, in which the client server is remotely located.

11. The thin client system of claim 1, wherein an operating system running on the client server comprises one or more operating systems.

12. The thin client system of claim 1, in which the input-output file further comprises a client processing module configured to generate the input sub-modules for receiving communication from at least one user of the thin client terminal and to generate the output sub-module to generate output to at least one different user.

13. The thin client system of claim 1, further comprising a session layout designer module configured to create and manage session layout templates.

14. The thin client system of claim 1, in which the client server is configured to be accessible via a web server.

15. The thin client system of claim 1, in which the touch-sensitive interface comprises tactile feedback capability.

16. The thin client system of claim 1, wherein non touch-sensitive interface is configured to be coupled to one of a display device and a projector device to receive input and output based on the input and output sub-modules.

17. A method for generating a virtual keyboard comprising:
   transferring at least one roaming keyboard file including input-output files from a client server to at least one thin client terminal comprised of a touch-sensitive interface; and
   generating a virtual keyboard by applying the at least one roaming keyboard file at the at least one thin client terminal, the input-output files including an input sub-module, of the input-output files, for receiving communication from at least one user and an output sub-module, of the input-output files, for generating an output to at least one user, the input sub-module including, a pointer pad sub-module, the pointer-pad sub-module configured to generate a multipoint interactive tool to receive a gesture input.

18. The method for generating virtual keyboard of claim 17, further comprising,
   selecting at least one roaming keyboard file for the at least one thin client terminal from a session layout module configured for selecting the type of interaction with the client server system.

19. A apparatus comprising:
   a thin client terminal configured to receive input-output files to:
   generate, input sub-modules for receiving communication from at least one user, and an output sub-module for generating output to at least one user, the generated input sub-module including, a virtual keyboard sub-module and a pointer pad sub-module, the pointer-pad sub-module configured to generate a multipoint interactive tool to receive a gesture input, the generated output sub-module including a virtual screen sub-module for generating output to at least one user, the thin client terminal configured to allow modular collaboration while multiplexing input and output message between sub-modules.

20. The apparatus of claim 19, in which the thin client terminal is further configured to receive input-output files to generate a selection configuration at the client terminal for selecting the type of interaction with a client server system.

* * * * *